US012719314B2

(12) United States Patent
Park et al.

(10) Patent No.: US 12,719,314 B2

(45) Date of Patent: Aug. 25, 2026

(54) WIRELESS POWER TRANSMISSION DEVICE, METHOD FOR CONTROLLING WIRELESS POWER TRANSMISSION DEVICE, AND WIRELESS POWER SYSTEM

(71) Applicant: Samsung Electronics Co., Ltd., Suwon-si (KR)

(72) Inventors: Namju Park, Suwon-si (KR); Jaejin Kim, Suwon-si (KR); Teaho Lee, Suwon-si (KR); Dongoh Kang, Suwon-si (KR); Jungsuk Chu, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/457,014

(22) Filed: Aug. 28, 2023

(65) Prior Publication Data

US 2023/0402883 A1 Dec. 14, 2023

Related U.S. Application Data

(63) Continuation of application No. PCT/KR2022/004367, filed on Mar. 29, 2022.

(30) Foreign Application Priority Data

Apr. 22, 2021 (KR) ........................ 10-2021-0052191

(51) Int. Cl.

*H02J 50/80* (2016.01)
*H02J 50/12* (2016.01)
*H02J 50/40* (2016.01)

(52) U.S. Cl.

CPC ............. *H02J 50/80* (2016.02); *H02J 50/12* (2016.02); *H02J 50/402* (2020.01)

(58) Field of Classification Search

CPC ........................... H02J 50/10–12; H02J 50/80; H05B 6/02–44; H05B 2213/06; H04B 5/79

See application file for complete search history.

(56) References Cited

U.S. PATENT DOCUMENTS 10,038,466 B2 7/2018 Park et al.
10,224,747 B2 3/2019 Moon et al.
(Continued)

FOREIGN PATENT DOCUMENTS

JP 2014086323 A 5/2014
JP 2020036519 A 3/2020
(Continued)

OTHER PUBLICATIONS

English machine translation of KR20150031852A published Mar. 25, 2015 (Year: 2015).*
(Continued)

*Primary Examiner* — Rexford N Barnie
*Assistant Examiner* — David A Shiao
(74) *Attorney, Agent, or Firm* — Nixon & Vanderhye, P.C.

(57) ABSTRACT

An example wireless power transmission apparatus includes a plate; a first communication module configured to perform wireless communication with an electronic device positioned on the plate; a power transmitting coil configured to transmit wireless power to the electronic device; a driving circuit configured to apply a current to the power transmitting coil; and a processor electrically connected to the first communication module, and the driving circuit. The processor is configured to control the driving circuit to periodically transmit the wireless power through the power transmitting coil, control the first communication module to acquire control information stored in a second communication module of the electronic device for a first time period (Continued)

during which transmission of the wireless power is stopped, and control the driving circuit to adjust the wireless power based on the control information.

10 Claims, 10 Drawing Sheets

(56) References Cited

U.S. PATENT DOCUMENTS 10,263,470 B2 4/2019 Joye et al.
10,910,881 B2 2/2021 Taniguchi et al.
10,972,890 B2 4/2021 Moritomo
11,063,477 B2 7/2021 Shichino
11,108,270 B2 8/2021 Lee et al.
11,329,512 B2 5/2022 Mashimo
2009/0033280 A1* 2/2009 Choi .................... H02J 50/10 320/108
2012/0112555 A1* 5/2012 Toshimitsu ............. H02J 50/12 307/104
2013/0033235 A1* 2/2013 Fukaya .................. H02J 50/80 307/104
2015/0087228 A1 3/2015 Porat et al.
2015/0341085 A1* 11/2015 Ettes .................... H02J 50/12 307/104
2016/0087691 A1* 3/2016 Van Wageningen .... H02J 50/80 307/104
2016/0141882 A1* 5/2016 Ichikawa ............... H02J 50/60 307/104
2016/0156232 A1* 6/2016 Joye ..................... H02J 50/10 307/104
2017/0149286 A1* 5/2017 Joye ..................... H04B 5/79
2019/0140699 A1* 5/2019 Park ..................... H02J 50/80
2019/0148966 A1 5/2019 Choi et al.
2019/0190567 A1* 6/2019 Moon .................... H04B 5/72
2019/0214854 A1 7/2019 Leem
2020/0395793 A1* 12/2020 Ettes .................. H02J 7/00308
2021/0376882 A1* 12/2021 Park ..................... H04B 5/79
2022/0037936 A1 2/2022 Ettes et al.
2023/0107009 A1* 4/2023 van Wageningen .... H02J 50/12 307/104
2023/0108910 A1* 4/2023 Choi ..................... H02J 50/80 307/104
2023/0275464 A1* 8/2023 Ganesh ................. H02J 50/12 307/104

FOREIGN PATENT DOCUMENTS

JP 6685158 B2 * 4/2020 ............. H02J 50/10
JP 6700911 B2 * 5/2020
JP 2020089134 A 6/2020
JP 2020182294 A 11/2020
KR 20140135794 A 11/2014
KR 20150031852 A * 3/2015
KR 101515480 B1 5/2015
KR 20170050986 A 5/2017
KR 20170139273 A 12/2017
KR 20180012962 A 2/2018
KR 20180028175 A 3/2018
KR 101848931 B1 4/2018
KR 10-2018-0081639 7/2018
KR 20180095332 A 8/2018
KR 20190054416 A 5/2019
KR 102036637 B1 10/2019
KR 20200082430 A 7/2020
KR 20200113371 A 10/2020
KR 102183887 B1 11/2020
KR 20200129490 A 11/2020
WO 2020114926 A1 6/2020

OTHER PUBLICATIONS

International Search Report for PCT/KR2022/004367 mailed Aug. 1, 2022, 4 pages.
Written Opinion of the ISA for PCT/KR2022/004367 mailed Aug. 1, 2022, 4 pages.
Office Action dated Jul. 24, 2025 in Korean Patent Application No. 10-2021-0052191 and English-language translation.
Decision of Final Rejection dated May 15, 2026 in Korean Application No. 10-2021-0052191 with English translation.

* cited by examiner

WIRELESS POWER TRANSMISSION DEVICE, METHOD FOR CONTROLLING WIRELESS POWER TRANSMISSION DEVICE, AND WIRELESS POWER SYSTEM

CROSS-REFERENCE TO RELATED APPLICATIONS

This application is a continuation of International Application No. PCT/KR2022/004367 designating the United States, filed on Mar. 29, 2022, in the Korean Intellectual Property Receiving Office and claiming priority to Korean Patent Application No. 10-2021-0052191, filed on Apr. 22, 2021, in the Korean Intellectual Property Office, the disclosures of which are incorporated by reference herein in their entireties.

BACKGROUND

Field

The disclosure relates to a wireless power transmission apparatus capable of supplying wireless power to an electronic device, a control method thereof, and a wireless power system.

Description of Related Art

Recently, wireless power transmission technologies have been developed and applied to many electronic devices. An electronic device to which wireless power transmission technologies are applied may receive power wirelessly without being directly connected to a charging connector. For example, technologies have been developed to provide wireless power to various home appliances using a product such as a cooktop including an induction. Wireless power transmission technologies include a magnetic induction method using a magnetic induction phenomenon between primary coils and secondary coils, and a magnetic resonance method by which primary coils and secondary coils use the same frequency.

Also, a wireless power transmitter transmitting wireless power and an electronic device receiving the wireless power may perform Near Field Communication (NFC) with each other. The electronic device and the wireless power transmitter each include a communication circuit for wireless communication and a coil for transmitting and receiving wireless power. When the communication circuit and the coil are disposed adjacent to each other, the wireless power transmitted through the coil may affect wireless communication by the communication circuit.

SUMMARY

Embodiments of the disclosure provide a wireless power transmission apparatus that may smoothly perform wireless communication and wireless power transmission and reception, even when a communication circuit for wireless communication and a coil for transmitting and receiving wireless power are disposed adjacent to each other, a control method thereof, and a wireless power system.

According to an example embodiment of the disclosure, a wireless power transmission apparatus may include a plate; a first communication module (including, e.g., a communication circuit) configured to perform wireless communication with an electronic device positioned on the plate; a power transmitting coil configured to transmit wireless power to the electronic device; a driving circuit configured to apply a current to the power transmitting coil; and a processor electrically connected to the first communication module, and the driving circuit, wherein the processor is configured to: control the driving circuit to periodically transmit the wireless power through the power transmitting coil, control the first communication module to acquire control information stored in a second communication module (including, e.g., a communication circuit) of the electronic device for a first time period during which transmission of the wireless power is stopped, and control the driving circuit to adjust the wireless power based on the control information.

According to an example embodiment of the disclosure, a control method of a wireless power transmission apparatus, which includes a first communication module (including, e.g., a communication circuit) configured to perform wireless communication with an electronic device, a power transmitting coil configured to transmit wireless power to the electronic device, a driving circuit configured to apply a current to the power transmitting coil, and a processor electrically connected to the first communication module and the driving circuit, may include receiving, by the first communication module, a detection signal of a second communication (including, e.g., a communication circuit) included in the electronic device; periodically transmitting the wireless power to the electronic device through the power transmitting coil; controlling, by the processor, the first communication module to acquire control information stored in a second communication module of the electronic device for a first time period during which transmission of the wireless power is stopped; and controlling, by the processor, the driving circuit to adjust the wireless power based on the control information.

According to an example embodiment of the disclosure, a wireless power system may include an electronic device; and a wireless power transmission apparatus including a first communication module (including, e.g., a communication circuit) configured to perform wireless communication with an electronic device and a power transmitting coil configured to transmit wireless power to the electronic device, wherein the wireless power transmission apparatus is configured to periodically transmit the wireless power to the electronic device, control the first communication module to acquire control information stored in a second communication module (including, e.g., a communication circuit) of the electronic device for a first time period during which transmission of the wireless power is stopped, and adjust the wireless power based on the control information.

The wireless power transmission apparatus, the control method thereof, and the wireless power system according to the disclosure can smoothly perform wireless communication and wireless power transmission and reception, even when a communication circuit for wireless communication and a coil for transmitting and receiving wireless power are disposed adjacent to each other.

Also, the wireless power transmission apparatus, the control method thereof, and the wireless power system can prevent (or reduce) damage to a communication circuit due to transmission and reception of wireless power.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 8A and FIG. 8B are flowcharts illustrating example operations of an example wireless power transmission apparatus and an example electronic device according to various embodiments.

DETAILED DESCRIPTION

Figure 1:
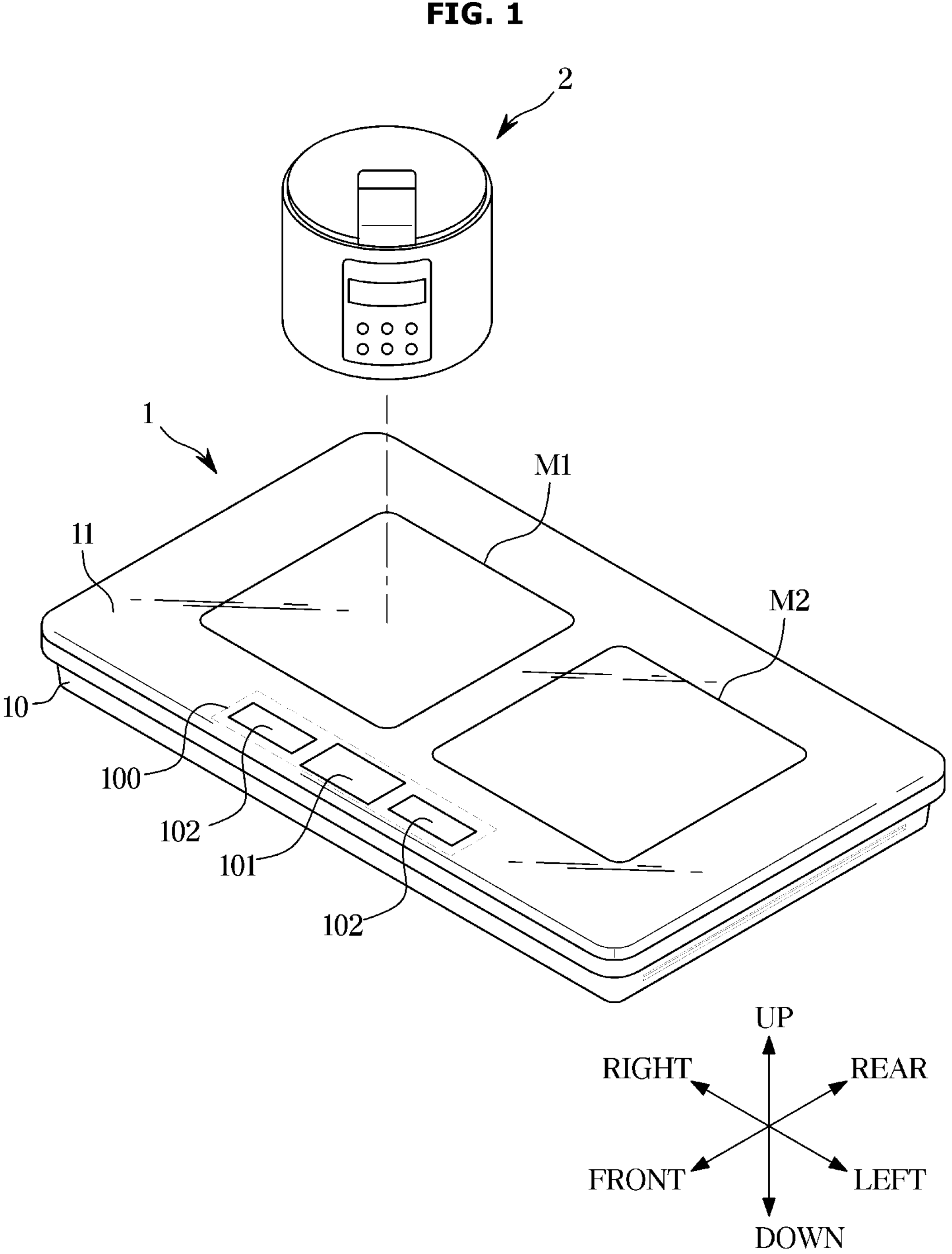
FIG. 1 illustrates an example wireless power system including a wireless power transmission apparatus and an electronic device according to various embodiments.

Like reference numerals throughout the specification denote like elements. Also, descriptions of elements well-known in the art to which the disclosure pertains or overlapped portions are omitted. The terms such as "—part", "—member", "—module", "—block", and the like may refer, for example, to at least one process processed by at least one hardware or software. According to example embodiments, a plurality of "—parts", "—members", "—modules", "—blocks" may be embodied as a single element, or a single "—part", "—member", "—module", "—block" may include a plurality of elements.

It will be understood that when an element is referred to as being "connected" to another element, it can be directly or indirectly connected to the other element, wherein the indirect connection includes "connection" via a wireless communication network or electrically through electrical wiring.

The terminology used herein is for the purpose of describing particular example embodiments only and is not intended to limit the disclosure. It is to be understood that the singular forms include plural forms as well, unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

Terms including ordinal numbers like "first" and "second" may be used to explain various components, but the components are not limited by the terms. The terms are only for the purpose of distinguishing one component from another. As used herein, the term "and/or" includes any and all combinations of one or more of the associated listed items.

Hereinafter, example embodiments of the disclosure will be described in detail with reference to the accompanying drawings.

Figure 2:
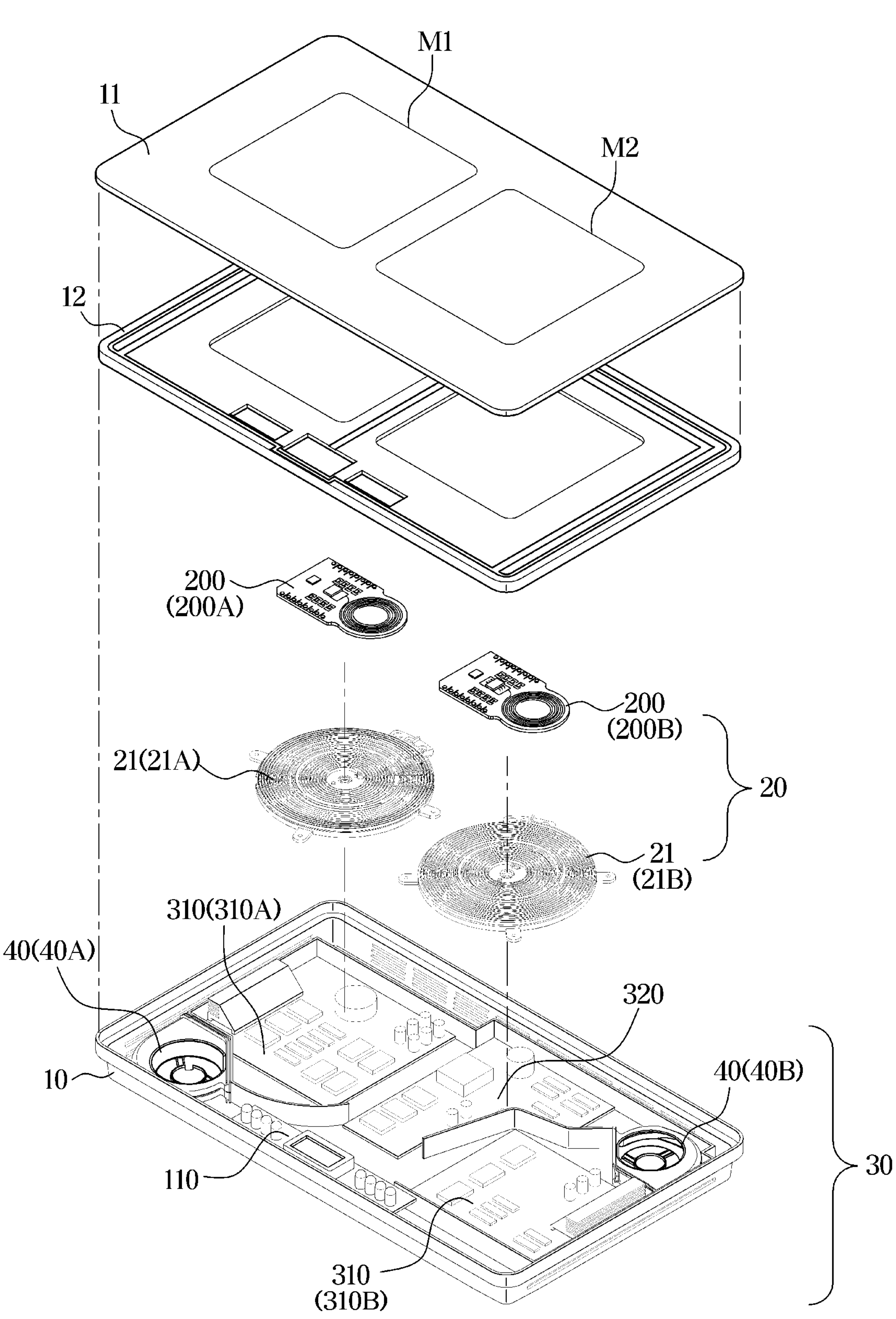
FIG. 2 is an exploded view of an example wireless power transmission apparatus according to various embodiments.

FIG. 1 illustrates an example wireless power system including an example wireless power transmission apparatus and an example electronic device according to various embodiments. FIG. 2 is an exploded view of an example wireless power transmission apparatus according to various embodiments.

Referring to FIG. 1, a wireless power system may include a wireless power transmission apparatus 1 and an electronic device 2. The wireless power transmission apparatus 1 may supply wireless power to the electronic device 2 capable of receiving the wireless power. In response to the electronic device 2 being positioned on driving areas M1, M2 provided on a plate 11 of the wireless power transmission apparatus 1, the wireless power transmission apparatus 1 may transmit wireless power to the electronic device 2.

The wireless power transmission apparatus 1 may be provided in various shapes. For example, the wireless power transmission apparatus 1 may be provided in a plate shape as shown in FIG. 1. The wireless power transmission apparatus 1 may be provided in a form of a table. The wireless power transmission apparatus 1 may be installed in various places where an external power source exists.

Also, the electronic device 2 may include a variety of electronic devices. For example, the electronic device 2 may be, for example, an electric rice cooker, an electric toaster, an electric blender, or a coffee maker. A bottom of the electronic device 2 in contact with the plate 11 may have a flat surface.

The wireless power transmission apparatus 1 may transmit wireless power to the electronic device 2 using a wireless power transmission technology based on a known magnetic induction method or a known magnetic resonance method. The magnetic induction method may be, for example, a method of changing a magnetic field of a power transmitting coil 21 to induce a voltage in a power receiving coil 510, thereby causing a current to flow through a secondary coil. The magnetic resonance method may be, for example, a method for causing a resonance phenomenon in the power transmitting coil 21 and the power receiving coil 510 by using the same resonance frequency and transmitting power by the resonance phenomenon.

Also, in response to a cooking container being placed on the plate 11, the wireless power transmission apparatus 1 may heat the cooking container. According to application of a current to the power transmitting coil 21, a magnetic field induced in the power transmitting coil 21 may pass through a bottom of the cooking container, and an eddy current rotating with respect to the magnetic field may be generated in the inside of the bottom of the cooking container. The cooking container may be heated by the eddy current.

The driving areas M1 and M2, through which the electronic device 2 receives the wireless power, may be provided on an upper surface of the plate 11. The driving areas M1 and M2 may each be provided at locations corresponding to the power transmitting coil 21 described below. In FIG. 1, two driving areas M1 and M2 are shown. However, a single driving area or three or more driving areas may be provided. The power transmitting coil 21 may be positioned at locations corresponding to the plurality of driving areas M1 and M2, respectively. The driving areas M1 and M2 may be divided into a first driving area M1 and a second driving area M2.

The wireless power transmission apparatus 1 may be connected to an external mobile device (not shown). The wireless power transmission apparatus 1 may be connected to the external mobile device (not shown) by wireless communication. After the wireless power transmission apparatus 1 is connected to the external mobile device (not shown), information about operations of the wireless power transmission apparatus 1 may be transmitted to the external mobile device (not shown). Also, the wireless power transmission apparatus 1 may be controllable by the external mobile device (not shown). A user may control the wireless power transmission apparatus 1 using the external mobile device (not shown).

Referring to FIG. 2, the wireless power transmission apparatus 1 may include housings 10 and 12 and the plate 11. The housings 10 and 12 may be divided into a lower housing 10 and an upper housing 12. The upper housing 12 may be coupled to the lower housing 10, and the plate 11 may be coupled to the upper housing 12. The lower housing 10, the upper housing 12 and the plate 11 may be made of various materials. For example and without limitation, the plate 11 may be made of tempered glass such as ceramic glass.

The plate 11 may receive user input and include a user interface 100 that displays information about operations of the wireless power transmission apparatus 1. For example, the user may operate the wireless power transmission apparatus 1 using the user interface 100. The user interface 100 may be positioned at various locations of the wireless power transmission apparatus 1. FIG. 1 and FIG. 2 illustrate that the user interface 100 is positioned on the upper surface of the plate 11, but the disclosure is not limited in this respect. The user interface 100 may be positioned on a front surface, a rear surface, a left surface, or a right surface of the wireless power transmission apparatus 1.

Referring to FIG. 2, the wireless power transmission apparatus 1 may include a coil assembly 20 and a driving assembly 30. The coil assembly 20 and the driving assembly 30 may be positioned between the upper housing 12 and the lower housing 10, and may be accommodated in the lower housing 10.

The coil assembly 20 may include the power transmitting coil 21 and a communication module 200 (including, e.g., a communication circuit). A variety of communication technologies may be applied to the communication module 200. For example, the communication module 200 may be implemented as a Near Field Communication (NFC) transceiver. The communication module 200 of the wireless power transmission apparatus 1 may be referred to as a 'first communication module' or 'NFC reader'.

One or more power transmitting coils 21 and one or more communication modules 200 may be provided. For example, the power transmitting coil 21 may include a first power transmitting coil 21A and a second power transmitting coil 21B. The communication module 200 may include a first NFC reader 200A and a second NFC reader 200B.

The power transmitting coil 21 and the communication module 200 may each be provided at locations corresponding to the driving areas M1 and M2. The first driving area M1 may be positioned above the first power transmitting coil 21A and the first NFC reader 200A, and the second driving area M2 may be positioned above the second power transmitting coil 21B and the second NFC reader 200B.

The first power transmitting coil 21A and the second power transmitting coil 21B may output the same power or different power. The first power transmitting coil 21A and the second power transmitting coil 21B may be independently driven under a control of a processor 322 (see FIG. 5) included in a control circuit 320. The power transmitting coil 21 may generate a magnetic field and/or an electromagnetic field based on a voltage and/or a current applied from a driving circuit 310, and transmit wireless power to the electronic device 2. In addition, the first NFC reader 200A and the second NFC reader 200B may be driven independently under a control of the processor 322.

The driving assembly 30 may include a fan 40, a user interface circuit 110, the driving circuit 310, and the control circuit 320. The driving assembly 30 may be accommodated in the lower housing 10. The user interface circuit 110, the driving circuit 310, and the control circuit 320 may be provided as separate circuit boards, or may be integrated into a single circuit board.

The fan 40 may circulate heat generated inside the wireless power transmission apparatus 1 and discharge the heat to the outside of the wireless power transmission apparatus 1. The processor 322 of the control circuit 320 may control rotation of the fan 40. One or more fans 40 may be provided. For example, the number of fans 40 may be the same as the number of power transmission coils 21. FIG. 2 illustrates that the fan includes a first fan 40A and a second fan 40B. The first fan 40A may be positioned below the first power transmitting coil 21A, and the second fan 40B may be positioned below the second power transmitting coil 21B.

The user interface circuit 110 may be a circuit board including a display panel and various circuit devices for implementing the user interface 100 shown in an external appearance of the wireless power transmission apparatus 1.

The driving circuit 310 may be electrically connected to the control circuit 320 and apply a current to the power transmitting coil 21. One or more driving circuits 310 may be provided. For example, the number of driving circuits 310 may be the same as the number of power transmitting coils 21. A first driving circuit 310A may apply a current to the first power transmitting coil 21A, and a second driving circuit 310B may apply a current to the second power transmitting coil 21B. In contrast, a single driving circuit 310 may apply a current to the plurality of power transmitting coils 21.

The control circuit 320 may be electrically connected to constituent components of the wireless power transmission apparatus 1. The control circuit 320 may include a memory 321 and the processor 322. See FIG. 5. The processor 322 may be electrically connected to the constituent components of the wireless power transmission apparatus 1 and control operations of each of the constituent components. The control circuit 320 may further include a separate communication module (not shown) for performing communication with an external mobile device.

Figure 3:
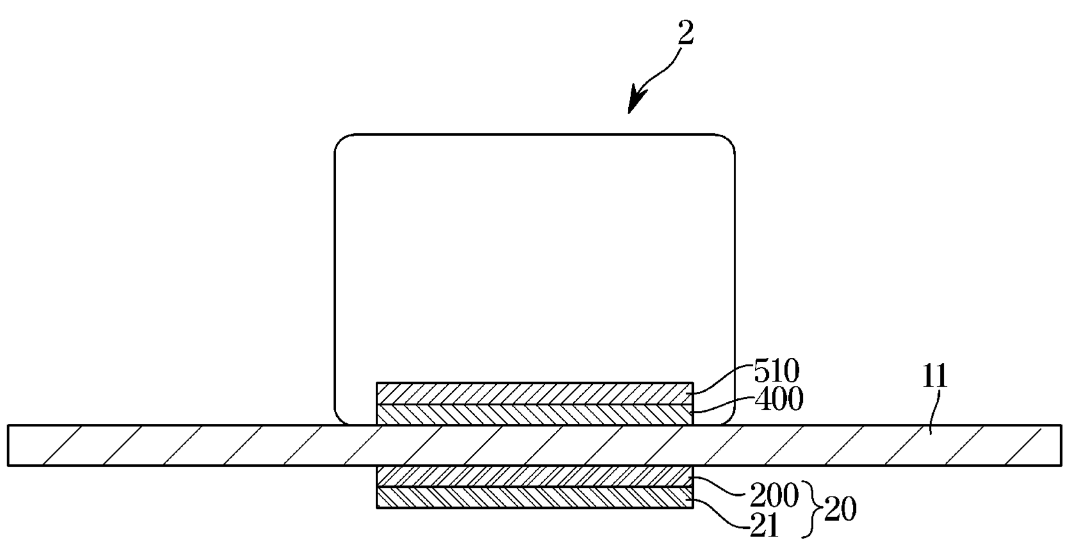
FIG. 3 schematically illustrates a cross-sectional view of an example wireless power transmission apparatus and an electronic device according to various embodiments.
Figure 4:
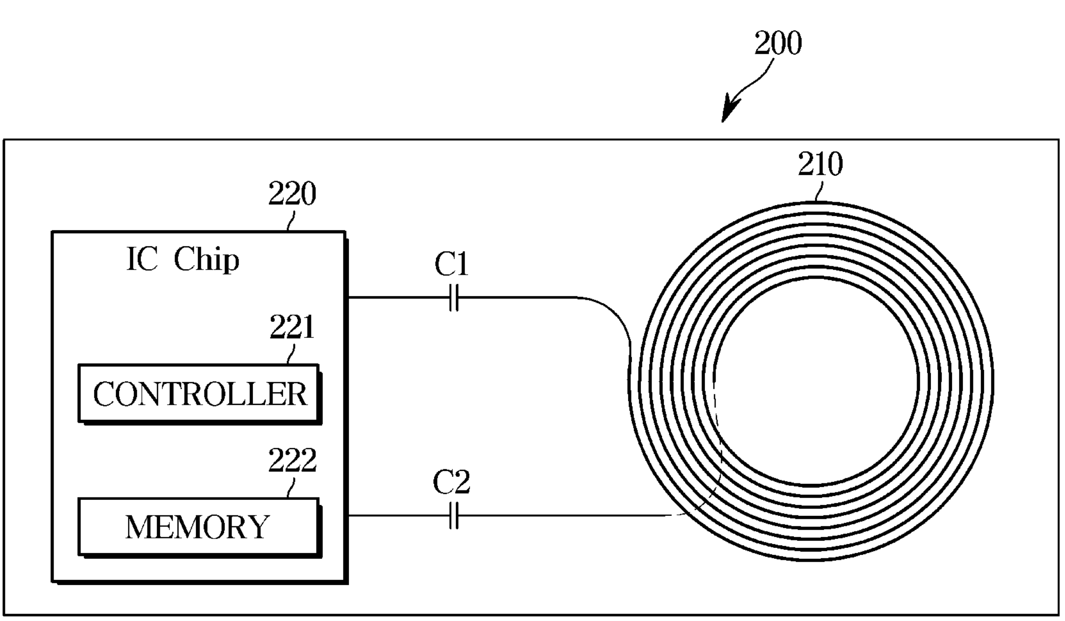
FIG. 4 illustrates a configuration of an example communication module according to various embodiments.

FIG. 3 schematically illustrates a cross-sectional view of an example wireless power transmission apparatus and an example electronic device according to various embodiments. FIG. 4 illustrates a configuration of an example communication module according to various embodiments.

Referring to FIG. 3, the electronic device 2 may be disposed on the plate 11 of the wireless power transmission apparatus 1. Specifically, the electronic device 2 may be positioned in the driving areas M1 and/or M2 of the plate 11. The processor 322 of the wireless power transmission apparatus 1 may detect a location of the electronic device 2 based on inductance of the power transmitting coil 21 which changes according to positioning of the electronic device 2 on the driving areas M1 and/or M2. In response to a device sensor 120 (see FIG. 5) being provided, the processor 322 may detect a location of the electronic device 2 based on a sensing signal of the device sensor 120.

As the electronic device 2 is disposed in the driving areas M1, M2 of the plate 11, the power transmitting coil 21 of the wireless power transmission apparatus 1, the first communication module 200 of the wireless power transmission apparatus 1, a second communication module 400 of the electronic device 2, and the power receiving coil 510 of the electronic device 2 may be arranged vertically. Subsequently, wireless communication may be performed between the wireless power transmission apparatus 1 and the electronic device 2, and transmission and reception of wireless power may be performed.

Meanwhile, because the power transmitting coil 21 and the first communication module 200 of the wireless power transmission apparatus 1 are disposed adjacent to each other, wireless power transmitted by the power transmitting coil 21 may affect the first communication module 200. Upon transmission of wireless power, a high voltage may be applied to the power transmitting coil 21 and a magnetic field generated by the power transmitting coil 21 may apply an induced voltage and/or an induced current to an antenna 210 of the first communication module 200. In response to the induced voltage and/or induced current applied to the antenna 210 of the first communication module 200 being too large, an integrated circuit (IC) chip 220 of the first communication module 200 may be damaged.

As shown in FIG. 4, capacitors C1 and C2 are provided in series between the antenna 210 and the IC chip 220 of the first communication module 200, thereby protecting the IC chip 220. A first capacitor C1 may be disposed between an end of the antenna 210 and the IC chip 220, and a second capacitor C2 may be disposed between another end of the antenna 210 and the IC chip 220.

The capacitors C1 and C2 connected in series between the antenna 210 and the IC chip 220 may form a high-pass filter. The high-pass filter blocks low frequencies (e.g., direct current (DC) voltage, DC current), reducing the voltage or current applied to the IC chip 220. Accordingly, damage to the IC chip 220 due to overcurrent or overvoltage may be prevented or reduced.

The electronic device 2 also includes the communication module 400 (including, e.g., a communication circuit). A variety of communication technologies may be applied to the communication module 400 of the electronic device 2. The communication module 400 of the electronic device 2 may be, for example, implemented as an 'NFC transceiver'. The communication module 400 of the electronic device 2 may be referred to as a 'second communication module' or 'NFC tag'. The communication module 400 of the electronic device 2 may include the same constituent components as those of the first communication module 200.

Because the power receiving coil 510 and the second communication module 400 of the electronic device 2 are disposed adjacent to each other, wireless power received by the power receiving coil 510 may affect the second communication module 400. To protect an IC chip 420 of the second communication module 200, the second communication module 400 of the electronic device 2 may, for example, include capacitors connected in series between an antenna 410 and the IC chip 420.

Figure 5:
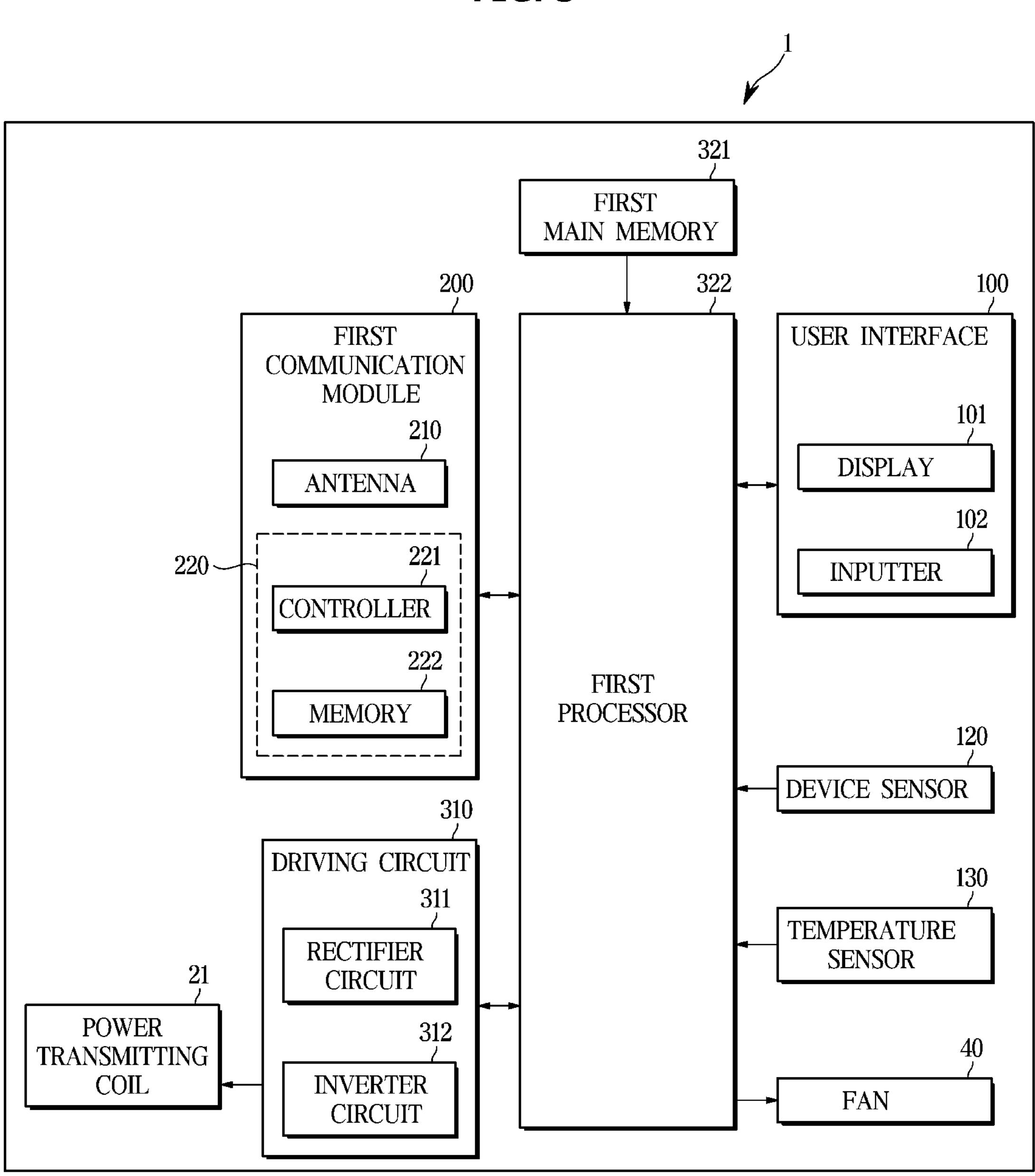
FIG. 5 is a control block diagram illustrating an example wireless power transmission apparatus according to various embodiments.

FIG. 5 is a control block diagram illustrating an example wireless power transmission apparatus according to various embodiments.

Referring to FIG. 5, the wireless power transmission apparatus 1 according to an embodiment may include the power transmitting coil 21, the fan 40, the user interface 100, the device sensor 120, a temperature sensor 130, the first communication module 200, the driving circuit 310, the first main memory 321, and the first processor 322.

The driving circuit 310 may receive power from an external power source, rectify the received power, and provide the rectified power to control circuit 320. The first processor 322 of the control circuit 320 may control the driving circuit 310 to distribute the rectified power to the fan 40, the user interface 100, the device sensor 120, the temperature sensor 130, and the first communication module 200. In addition, the first processor 322 may control the driving circuit 310 to apply a current to the power transmitting coil 21.

The driving circuit 310 may include a rectifier circuit 311 and an inverter circuit 312. The rectifier circuit 311 may convert alternating current (AC) power into DC power. The rectifier circuit 311 converts an AC voltage whose magnitude and polarity (positive voltage or negative voltage) change with time into a DC voltage whose magnitude and polarity are constant, and converts an alternating current whose magnitude and direction (positive current or negative voltage) change with time into a direct current whose magnitude is constant.

The rectifier circuit 311 may include, for example, a bridge diode. The circuit 311 may, for example, include four diodes. The diodes may form two diode pairs in which two diodes are connected in series with each other, and the diode pairs may be connected in parallel with each other. The bridge diode may convert an AC voltage whose polarity changes with time into a positive voltage having a constant polarity, and convert an alternating current whose direction changes with time into a positive current having a constant direction.

Also, the rectifier circuit 311 may include, for example, a DC link capacitor. The DC link capacitor may convert a positive voltage whose magnitude changes with time to a DC voltage having a constant magnitude. The DC link capacitor may maintain the converted DC voltage and provide the converted DC voltage to the inverter circuit 312.

The inverter circuit 312 may switch a voltage applied to the power transmitting coil 21 to cause a current to flow to the power transmitting coil 21. The inverter circuit 312 may include a resonant capacitor and a switching circuit for supplying or stopping a current to the power transmitting coil 21. The resonant capacitor may function as a buffer and determine a resonant frequency of the power transmitting coil 21. One end of the power transmitting coil 21 may be connected to a node of the switching circuit, and the other end of the power transmitting coil 21 may be connected to the resonant capacitor. The switching circuit may be opened or closed according to a control signal transmitted from the control circuit 320. The power transmitting coil 21 may transmit wireless power by a switching operation (ON/OFF) of the switching circuit.

Because the switching circuit may open and close at high speed, the switching circuit may be implemented as a three-terminal semiconductor switch having a high response speed. For example, the switching circuit may include a Bipolar Junction Transistor (BJT), a Metal Oxide Semiconductor Field Effect Transistor (MOSFET), an Insulated Gate Bipolar Transistor (IGBT), or a thyristor.

The power transmitting coil 21 may form a magnetic field by a current applied from the inverter circuit 312. By the magnetic field, a current and a voltage may be applied to the power receiving coil 510 of the electronic device 2 positioned in the driving areas M1 and M2 of the plate 11.

The device sensor 120 and the temperature sensor 130 may be provided in the power transmitting coil 21. For example, the device sensor 120 and the temperature sensor 130 may be located in a center of the power transmitting coil 21. The device sensor 120 and the temperature sensor 130 may be located around the power transmitting coil 21.

The device sensor 120 may detect the electronic device 2 placed in the driving areas M1 and M2 of the plate 11. The device sensor 120 may include a capacitive sensor capable of detecting a capacitance change caused by the electronic device 2. The device sensor 120 may also include at least one of an infrared sensor, a weight sensor, a micro switch, or a membrane switch. The device sensor 120 may also include other various sensors.

The temperature sensor 130 may measure a temperature of the plate 11, a temperature of the power transmitting coil 21, and/or an internal temperature of the lower housing 10. The temperature sensor 130 may include, for example, a thermistor of which an electrical resistance value changes according to temperature. The temperature sensor 130 may transmit temperature data to the processor 322 of the control circuit 320, and the processor 322 may determine overheating based on the temperature data. For example, upon overheating of the plate 11, the processor 322 may control the driving circuit 310 to interrupt the wireless power transmission by the power transmitting coil 21.

The device sensor 120 may transmit a sensing signal to the processor 322 of the control circuit 320, in response to sensing the electronic device 2. Also, in response to a user input made on a power-on button of the user interface 100, the user interface 100 may transmit a wake-up signal to the processor 322 of the control circuit 320. The processor 322 may turn on the wireless power transmission apparatus 1 or switch from a standby mode to an operating mode based on the sensing signal and/or the wake-up signal.

In various embodiments, the device sensor 120 may be omitted. In this case, the processor 322 may function as the device sensor 120. The processor 322 may detect a location of the electronic device 2 based on inductance of the power transmitting coil 21 which changes according to positioning of the electronic device 2 on the driving areas M1 and M2. The inductance of the power transmitting coil 21 measured upon positioning of the electronic device 2 on the driving areas M1 and M2 may be different from inductance of the power transmitting coil 21 measured upon absence of the electronic device 2 on the driving areas M1 and M2. The processor 322 may control the driving circuit 310 to apply a sensing current for detecting the electronic device 2 to the power transmitting coil 21. The electronic device 2 may be detected by various methods other than the methods described above.

The user interface 100 may include a display 101 and an input device including, e.g., an input circuit 102. The input device 102 may include, for example, at least one of a physical button, a touch button, a touch pad, a knob, a jog shuttle, a control stick, a trackball, or a track pad. The user interface 100 may also be provided as a touch screen into which the display 101 and the inputter 102 are integrated.

The first communication module 200 may be implemented using various wireless communication technologies. For example, at least one of Radio Frequency (RF), Infrared Communication, Wireless Fidelity (Wi-Fi), Bluetooth, Zigbee, or Near Field Communication (NFC) may be applied to the first communication module 200. The first communication module 200 may be, for example, an NFC module. The NFC module may communicate with an NFC tag included in the electronic device 2. The NFC module may, for example, function as a tag or a reader depending on a situation.

The first communication module 200 may include the antenna 210 and the IC chip 220. The IC chip may include a controller 221 and a memory 222. The controller 221 (including, e.g., a control circuit) may control an operation of the first communication module 200, and the memory 222 may record and store data and/or information transmitted or received via the antenna 210. The memory 222 of the first communication module 200 may be implemented as, for example, a non-volatile memory, such as Read-Only Memory (ROM), Erasable Programmable Read-Only Memory (EPROM), or Electrically Erasable Programmable Read-Only Memory (EEPROM).

The first communication module 200 may perform wireless communication with the second communication module 400 (including, e.g., a communication circuit) of the electronic device 2. The wireless communication between the first communication module 200 and the second communication module 400 may be Near Field Communication (NFC). The first communication module 200 may transmit data to the second communication module 400 of the electronic device 2 or receive data from the second communication module 400 of the electronic device 2.

For example, the first communication module 200 may acquire control information of the electronic device 2 from the second communication module 400. The electronic device 2 may be driven based on the control information including an operating mode and/or an operating time. The control information may further include required power information. The operating mode and the operating time may be determined by operation settings of the electronic device 2. Also, the required power information may be determined based on, for example, the operating mode and the operating time. The control information of the electronic device 2 may be input through a user interface 530. See FIG. 6. The control information of the electronic device 2 may be stored in a second main memory 550 and/or a memory 422 of the second communication module 400.

Also, the control information may further include, for example, data about an operation state of the electronic device 2. The first processor 322 of the wireless power transmission apparatus 1 may determine a standby state, a start state, an in-progress state, or an operation completion state of the electronic device 2 based on the operation state data received from the second communication module 400.

The first main memory 321 may store, for example, programs, instructions and/or data for controlling operations of the wireless power transmission apparatus 1. The first processor 322 may generate a control signal for controlling operations of the wireless power transmission apparatus 1 based on the programs, instructions and/or data stored in the first main memory 321. The first processor 322 may include, for example, a logic circuit and/or an operational circuit as hardware. The first processor 322 may process data according to the program and/or instruction provided from the first main memory 321, and generate a control signal according to a result of the processing.

The first main memory 321 may include, for example, a volatile memory, such as Static Random Access Memory (SRAM) or Dynamic Random Access Memory (DRAM), for temporary storage of data, and a non-volatile memory, such as Read Only Memory (ROM), Erasable Programmable Read Only Memory (EPROM), or Electrically Erasable Programmable Read Only Memory (EEPROM), for long-term storage of data.

The first processor 322 may control the driving circuit 310 to periodically transmit wireless power to the electronic device 2 through the power transmitting coil 21. The first processor 322 may receive a detection signal of the second communication module 400 of the electronic device 2 from the first communication module 200, and determine periodic transmission of wireless power based on the detection signal. In addition, the first processor 322 may control the first communication module 200 to acquire control information stored in the second communication module 400 of the electronic device 2 for a first time period during which transmission of wireless power is stopped. The first processor 322 may control the driving circuit 310 to adjust wireless power based on the control information. For example, the control information may include required power information determined by operation settings of the electronic device 2, and the first processor 322 may adjust a magnitude of wireless power to be transmitted based on the required power information.

The first processor 322 may control the first communication module 200 and the driving circuit 310 to alternately repeat the acquisition of the control information and the transmission of the wireless power based on a predetermined cycle. Specifically, the first processor 322 may control the first communication module 200 to perform wireless communication with the electronic device 2 for a first time period within the predetermined cycle, and control the driving circuit 310 to transmit wireless power through the power transmitting coil 21 for a second time period longer than the first time period.

The wireless power transmission apparatus 1 may further include other constituent components in addition to the constituent components described above. Also, some of the aforementioned constituent components may be omitted in the wireless power transmission apparatus 1.

Figure 6:
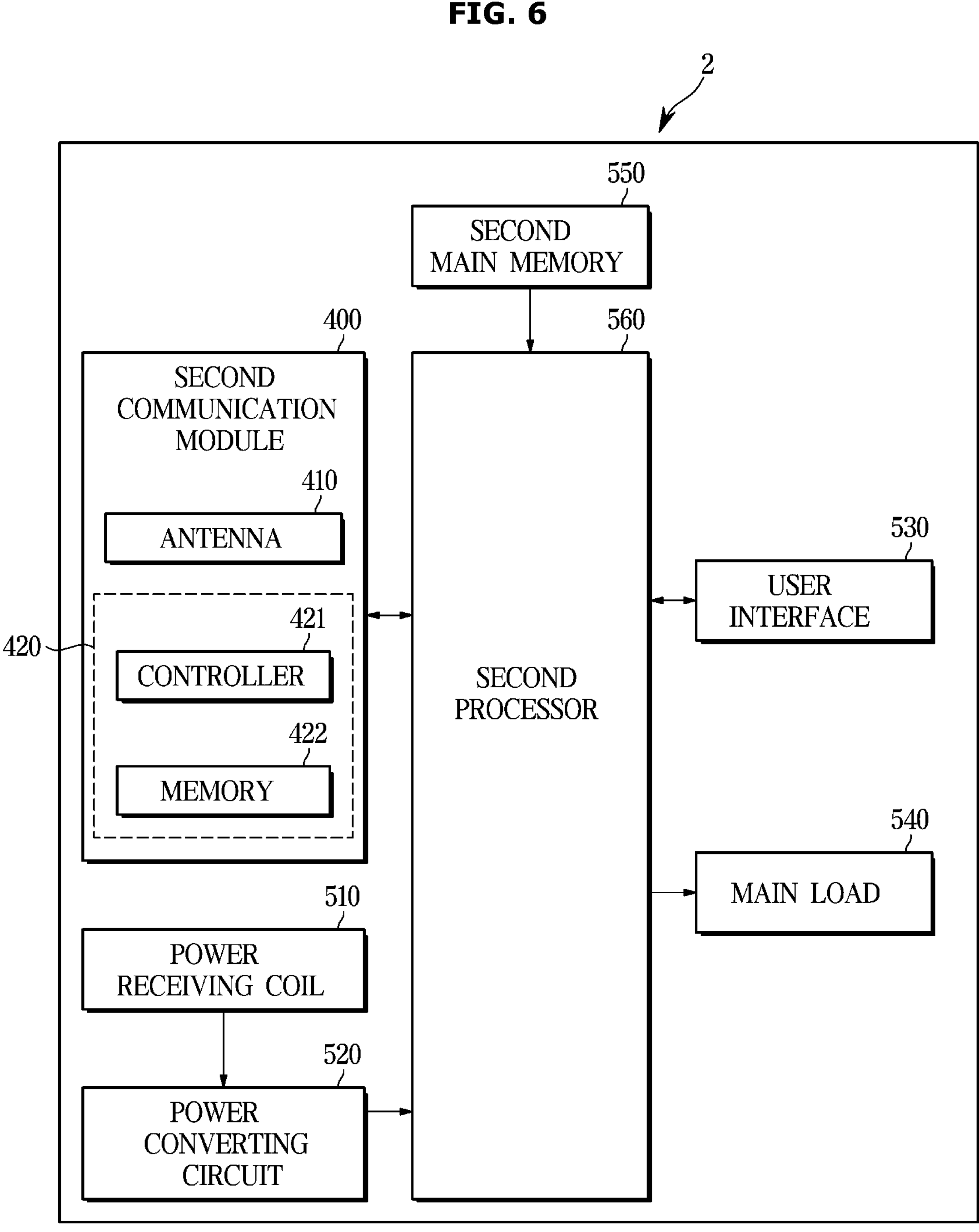
FIG. 6 is a control block diagram illustrating an example electronic device receiving wireless power from an example wireless power transmission apparatus according to various embodiments.

FIG. 6 is a control block diagram illustrating an example electronic device 2 receiving wireless power from an example wireless power transmission apparatus 1 according to various embodiments.

Referring to FIG. 6, the electronic device 2 may include the second communication module 400, the power receiving coil 510, a power converting circuit 520, the user interface 530, a main load 540, the second main memory 550, and a second processor 560.

The second communication module 400 may perform wireless communication with the first communication module 200 of the wireless power transmission apparatus 1. The second communication module 400 may be implemented using various wireless communication technologies. For example, at least one of Radio Frequency (RF), infrared communication, wireless fidelity (Wi-Fi), Bluetooth, Zigbee, or Near Field Communication (NFC) may be applied to the second communication module 400. The second communication module 400 may, for example, be implemented as an NFC tag.

The second communication module 400 of the electronic device 2 may be powered by an electromagnetic field generated by the first communication module 200 of the wireless power transmission apparatus 1. In response to the antenna 210 of the first communication module 200 and the antenna 410 of the second communication module 400 being close to each other, current may flow in the antenna 410 of the second communication module 400. The IC chip 420 may operate by receiving a current from the antenna 410.

The second communication module 400 of the electronic device 2 may include the antenna 410 and the IC chip 420. The IC chip 420 may include a controller 421 (including, e.g., a control circuit) and a memory 422. The controller 421 may control operations of the second communication module 400, and the memory 422 may record and store data and/or information transmitted or received via the antenna 410. The memory 422 of the second communication module 400 may be implemented as, for example, a non-volatile memory, such as Read-Only Memory (ROM), Erasable Programmable Read-Only Memory (EPROM), or Electrically Erasable Programmable Read-Only Memory (EEPROM).

The power receiving coil 510 may receive power from the power transmitting coil 21 of the wireless power transmission apparatus 1. In response to the electronic device 2 being disposed on the driving areas M1 and M2 provided on the plate 11 of the wireless power transmission apparatus 1, the power receiving coil 510 may receive power by electromagnetic induction.

The power converting circuit 520 may supply the power received through the power receiving coil 510 to the user interface 530, the main load 540, and the second processor 560. The second processor 560 may control the power converting circuit 520 to distribute power to each of the second communication module 400, the user interface 530, and the main load 540. As required, the power converting circuit 520 may supply power to the second communication module 400.

The power converting circuit 520 may include, for example, a rectifier circuit. An AC voltage and an AC current may be applied to the power receiving coil 510 which receives power from the power transmitting coil 21. Because the user interface 530, the main load 540, and the processor 470 of the electronic device 2 in various example embodiments require DC power, the power converting circuit 520 is required. Also, the power converting circuit 520 may include a DC-DC converter for applying appropriate power to each constituent component of the electronic device 2. The power converting circuit 520 may be implemented as, for example, a switched mode power supply (SMPS). The SMPS is a power supply device for converting and supplying AC power or DC power through a switching operation.

The user interface 530 may receive a command related to an operation of the electronic device 2 from a user. The user interface 530 may include at least one of a physical button, a touch button, or a dial. The user interface 530 may also include a display or may be implemented as a touch screen.

The main load 540 refers to a component that consumes the greatest power in the electronic device 2. For example, in a case in which the electronic device 2 is an electric kettle, the main load 450 may be a heat source such as a heater. In a case in which the electronic device 2 is a blender, the main load 450 may be a motor.

The second main memory 550 may store programs, instructions and/or data for controlling operations of the electronic device 2. The second processor 560 may be electrically connected to constituent components of the electronic device 2, and may control each of the constituent components. That is, the second processor 560 may control the second communication module 400, the power converting circuit 520, the user interface 530, and the main load 540. The second processor 560 may generate a control signal for controlling operations of the electronic device 2 based on the programs, instructions and/or data stored in the second main memory 550.

The electronic device 2 may further include other constituent components in addition to the aforementioned constituent components. Also, some of the aforementioned constituent components may be omitted in the electronic device 2.

Hereinafter, a control method of a wireless power transmission apparatus 1 according to an embodiment is described in detail.

Figure 7:
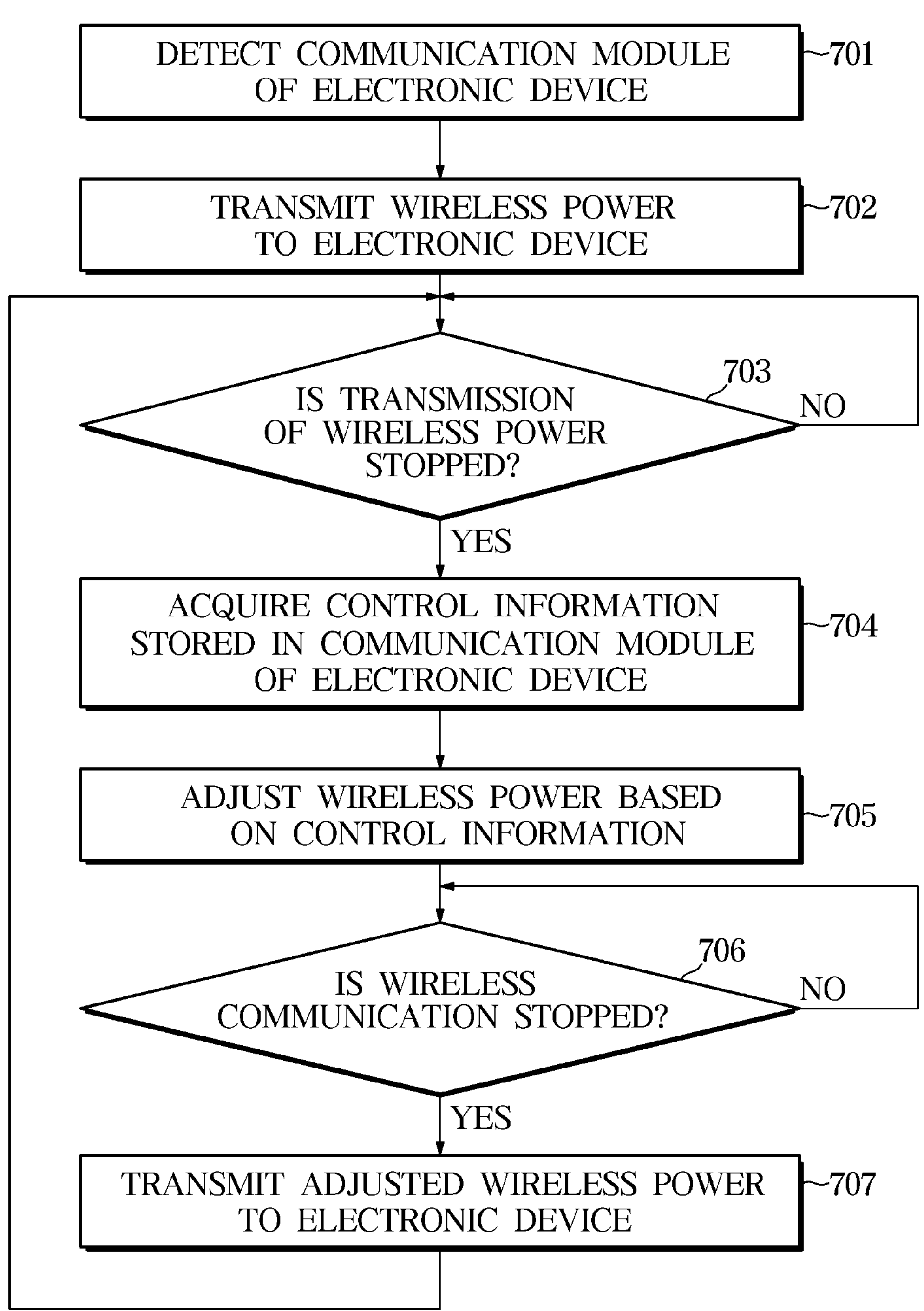
FIG. 7 is a flowchart illustrating an example control method of a wireless power transmission apparatus according to various embodiments.

FIG. 7 is a flowchart illustrating an example control method of an example wireless power transmission apparatus according to various embodiments.

Referring to FIG. 7, the first processor 322 of the wireless power transmission apparatus 1 may control the first communication module 200 to detect the second communication module 400 of the electronic device 2 (701). For example, the first communication module 200 of the wireless power transmission apparatus 1 may generate an electromagnetic field and transmit a detection signal. The second communication module 400 of the electronic device 2 may transmit a response signal in response to the detection signal. In response to receiving the response signal, the first communication module 200 may transmit the detection signal of the second communication module 400 to the first processor 322 of the wireless power transmission apparatus 1. In response to receiving the detection signal, the first processor 322 of the wireless power transmission apparatus 1 may determine that the electronic device 2 is disposed in the driving areas M1 and/or M2 of the plate 11.

The first processor 322 may control the driving circuit 310 to transmit wireless power to the electronic device 2 through the power transmitting coil 21 (702). The first processor 322 may determine periodic transmission of the wireless power based on the detection signal of the second communication module 400 transmitted from the first communication module 200.

Meanwhile, while the wireless power is transmitted to the electronic device 2, control information may be input through the user interface 530 of the electronic device 2. The input control information may be stored in the memory 422 of the second communication module 400. The control information may include data about at least one of an operating mode, an operating time, required power information or operation state of the electronic device 2.

Also, in response to the transmission of wireless power being stopped, the first processor 322 may control the first communication module 200 to acquire control information stored in the second communication module 400 of the electronic device 2 for a first time period during which transmission of wireless power is stopped (703, 704). The transmission of wireless power may be stopped, for example, by blocking a current applied to the first communication module 200 by the first processor 322. The first processor 322 may determine stopping of the transmission of wireless power and resuming of the transmission of wireless power based on a predetermined cycle.

The first processor 322 may adjust wireless power based on the control information (705). The first processor 322 may change wireless power to be transmitted in a next cycle, in response to a change in the control information. However, in response to no change in the control information, the wireless power to be transmitted in the next cycle may be maintained to be the same as the wireless power transmitted in a previous cycle.

The control information may include required power information determined by operation settings of the electronic device 2, and the first processor 322 may adjust a magnitude of the wireless power to be transmitted based on the required power information. For example, when the electronic device 2 is an electric kettle, a setting of a heating temperature may correspond to a setting of an operating mode, and a setting of a heating time may correspond to a setting of an operating time. Also, when the electronic device 2 is a blender, a setting of motor rotation speed may correspond to a setting of operating mode, and a setting of motor running time may correspond to a setting of operating time. Required power of the electric kettle may vary depending on the setting of the heating temperature. Based on the heating temperature set to 100° C. and the operating time set to 5 minutes, the required power of the electric kettle may be 1600 W. Required power of the blender may vary depending on the setting of the motor rotation speed. As such, the required power of the electronic device 2 may change depending on the type and the operation setting of the electronic device 2.

In response to wireless communication being stopped by the first communication module 200 (706), the first processor 322 of the wireless power transmission apparatus 1 may control the driving circuit 310 to transmit the adjusted wireless power to the electronic device 2 (707). The first communication module 200 may stop the wireless communication based on, for example, a power transmission initiation signal transmitted from the first processor 322, and resume the wireless communication based on a power transmission stop signal transmitted from the first processor 322.

The first processor 322 may control the first communication module 200 and the driving circuit 310 to alternately repeat the acquisition of the control information and the transmission of the wireless power based on a predetermined cycle. Specifically, the first processor 322 may control the first communication module 200 to perform the wireless communication with the electronic device 2 for a first time period within a predetermined cycle, and control the driving circuit 310 to transmit wireless power through the power transmitting coil 21 for a second time period within the predetermined cycle longer than the first time period.

The wireless power transmission apparatus 1 may periodically repeat the acquisition of the control information and the transmission of wireless power until the electronic device 2 terminates an operation. For example, it may be determined that the operation of the electronic device 2 has ended, upon input of an end of operation through the user interface 530, upon completion of the operation by expiration of operating time, or upon detection of deviation of the electronic device 2 from the driving areas M1, M2 of the plate 11.

Figure 8A:
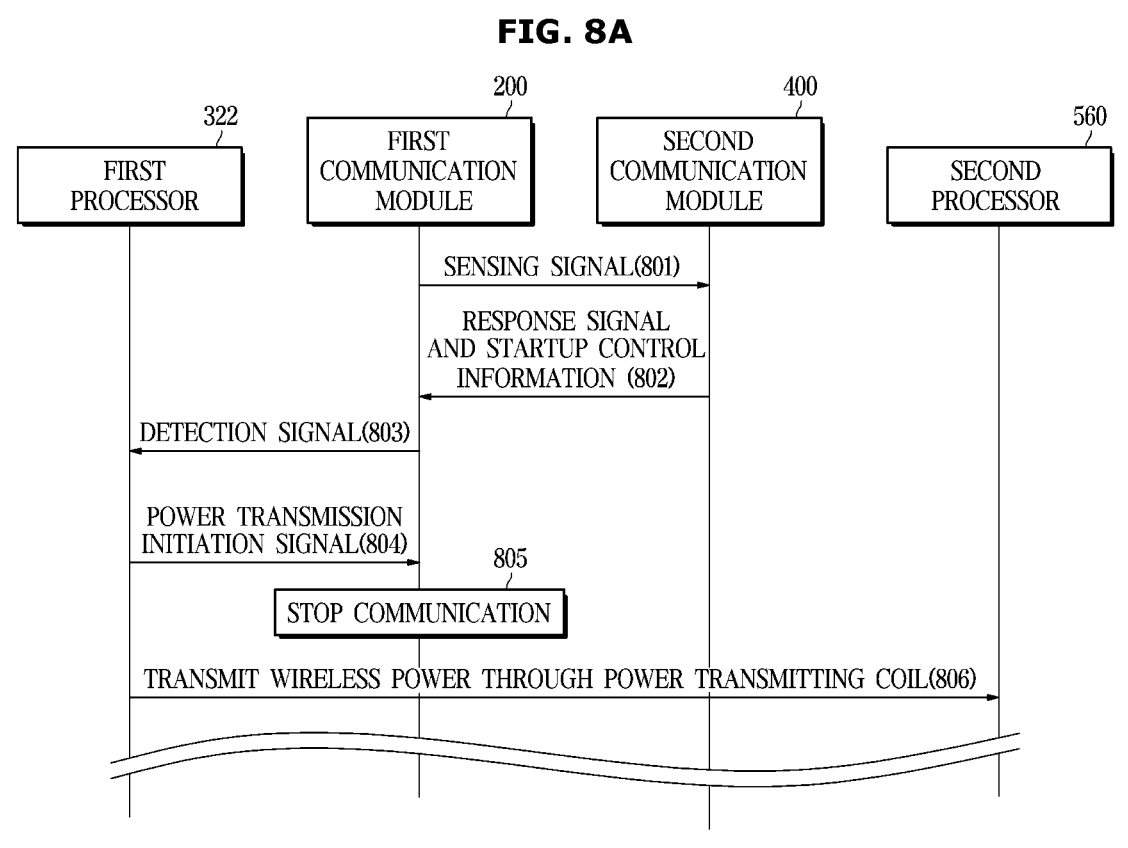
Figure 8B:
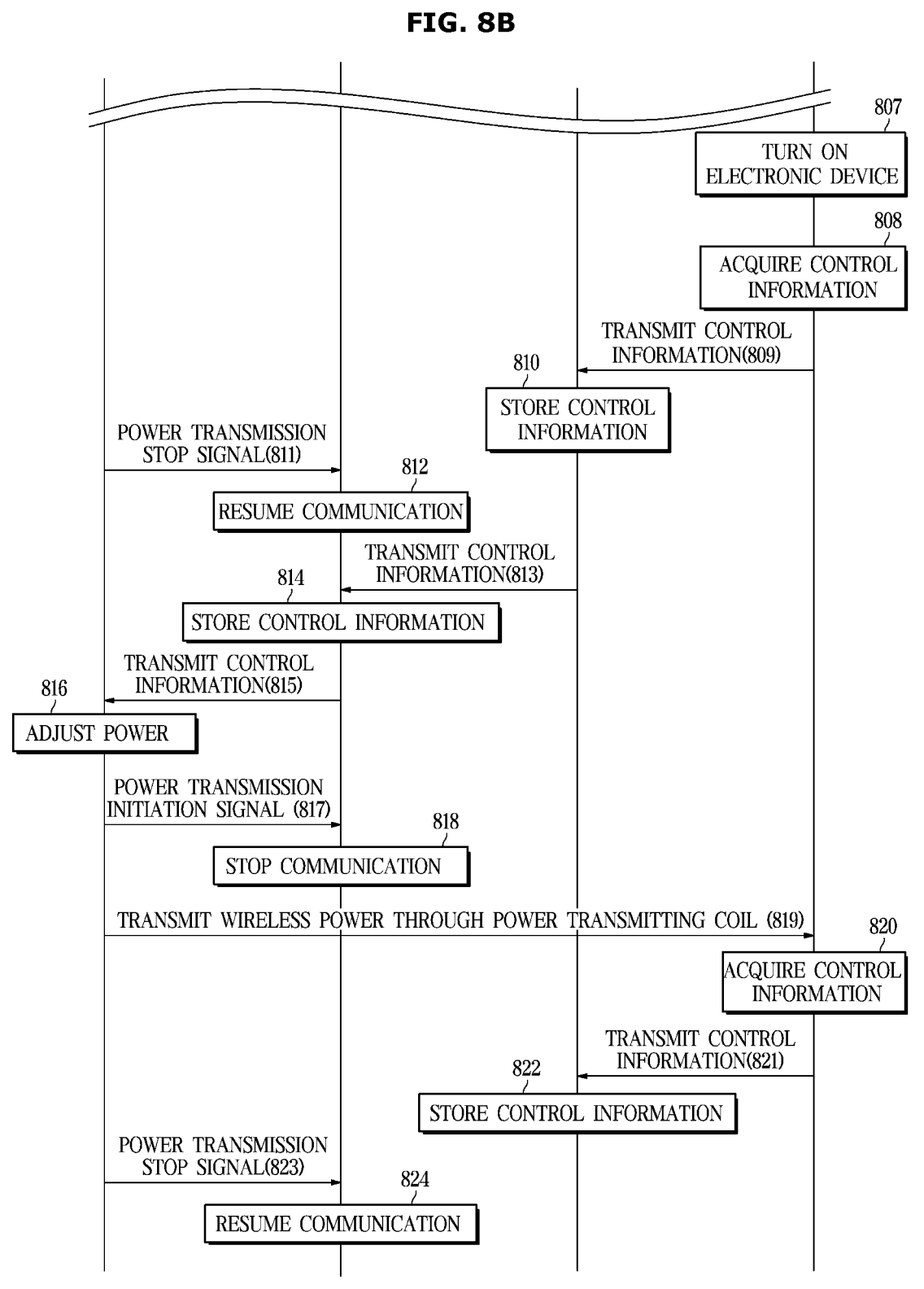

FIG. 8A and FIG. 8B are flowcharts illustrating example operations of an example wireless power transmission apparatus and an example electronic device according to various embodiments.

Referring to FIG. 8A, the first processor 322 of the wireless power transmission apparatus 1 may control the first communication module 200 to transmit a sensing signal for sensing the second communication module 400 of the electronic device 2 (801). The sensing signal may, for example, be periodically transmitted based on a predetermined cycle. The sensing signal may refer, for example, to a carrier electromagnetic field generated by the first communication module 200 of the wireless power transmission apparatus 1.

The second communication module 400 of the electronic device 2 may be operated by receiving power from the sensing signal, and may transmit a response signal in response to the sensing signal. Accordingly, wireless communication may be performed between the first communication module 200 of the wireless power transmission apparatus 1 and the second communication module 400 of the electronic device 2.

Also, the second communication module 400 of the electronic device 2 may transmit startup control information stored in the memory 422 to the first communication module 200 (802). The startup control information may include, for example, at least one of an identification number of the electronic device 2, a type of the electronic device 2, a rated voltage, a rated current, a rated power, or a startup power required to turn on the electronic device 2.

The first communication module 200 may transmit a detection signal of the second communication module 400 to the first processor 322 of the wireless power transmission apparatus 1, upon receiving the response signal from the second communication module 400 (803). Upon receiving the detection signal, the first processor 322 of the wireless power transmission apparatus 1 may determine that the electronic device 2 is disposed in the driving areas M1, M2 of the plate 11.

The first processor 322 of the wireless power transmission apparatus 1 may transmit a power transmission initiation signal to the first communication module 200 (804). The first communication module 200 may stop the wireless communication based on the power transmission initiation signal transmitted from the first processor 322 (805). The transmission of wireless power may be stopped, for example, by blocking a current applied to the first communication module 200 by the first processor 322.

In response to the wireless communication being stopped by the first communication module 200, the first processor 322 of the wireless power transmission apparatus 1 may control the driving circuit 310 to transmit wireless power through the power transmitting coil 21 (806). Wireless power initially transmitted to the electronic device 2 may be determined based on the startup control information. In other words, in response to the second communication module 400 of the electronic device 2 being detected, the first processor 322 of the wireless power transmission apparatus 1 may control the driving circuit 310 to transmit startup power to turn on the electronic device 2.

Referring to FIG. 8B, the second processor 560 of the electronic device 2 may turn on the electronic device 2 (807), in response to receiving the startup power from the wireless power transmission apparatus 1. Also, as the electronic device 2 is turned on, the user interface 530 of the electronic device 2 may be activated. The second processor 560 of the electronic device 2 may acquire control information input through the user interface 530 (808). The second processor 560 transfers the acquired control information to the memory 422 of the second communication module 400 (809), and the memory 422 of the second communication module 400 may store the control information. (810). The control information stored in the memory 422 of the second communication module 400 is not transmitted to the first communication module 200, unless wireless communication with the first communication module 200 is resumed.

The first processor 322 of the wireless power transmission apparatus 1 may transmit a power transmission stop signal to the first communication module 200 based on a predetermined cycle (811). The first communication module 200 may resume the wireless communication with the second communication module 400 of the electronic device 2 based on the power transmission stop signal (812). In response to resuming the wireless communication, the second communication module 400 of the electronic device 2 may transmit the control information stored in the memory 422 to the first communication module 200 (813). The control information may be stored in the memory 222 to the first communication module 200 (814) and transmitted to the first processor 322 (815).

The first communication module 200 may acquire the control information from the second communication module 400, after a predetermined period of time elapses from a point in time that the power transmission stop signal is received, in order to remove an influence of the wireless power transmitted through the power transmitting coil 21 on the first communication module 200 and the second communication module 400.

The first processor 322 of the wireless power transmission apparatus 1 may adjust the wireless power based on the control information (816). The first processor 322 may adjust the wireless power based on required power information included in the control information. The first processor 322 may change wireless power to be transmitted in a next cycle, in response to a change in the control information. However, in response to no change in the control information, the wireless power to be transmitted in the next cycle may be maintained to be the same as the wireless power transmitted in a previous cycle. That is, adjusting the wireless power may include changing the wireless power or maintaining the wireless power.

The first processor 322 may transmit the power transmission initiation signal to the first communication module 200 based on a predetermined cycle (817). The first communication module 200 may stop the wireless communication based on the power transmission initiation sign transmitted from the first processor 322 (818).

In response to the wireless communication being stopped by the first communication module 200, the first processor 322 may control the driving circuit 310 to transmit the adjusted wireless power through the power transmitting coil 21 (819). The second processor 560 of the electronic device 2 may control an operation of the electronic device 2 according to the control information, as the adjusted wireless power is received.

The second processor 560 of the electronic device 2 may acquire the control information while receiving the wireless power from the wireless power transmission apparatus 1 (820), transmit the acquired control information to the second communication module 400 (821), and store the acquired control information in the memory 422 of the second communication module (822). The first processor 322 of the wireless power transmission apparatus 1 may transmit a power transmission stop signal to the first communication module 200 based on a predetermined cycle (823), and the first communication module 200 may resume the wireless communication with the second communication module 400 of the electronic device 2 based on the power transmission stop signal (824).

The wireless power transmission apparatus 1 may periodically repeat the acquisition of the control information and the transmission of wireless power, until the electronic device 2 terminates an operation. For example, it may be determined that the operation of the electronic device 2 has ended, upon input of an end of operation through the user interface 530, upon completion of the operation by expiration of operating time, or upon detection of deviation of the electronic device 2 from the driving areas M1, M2 of the plate 11.

Figure 9:
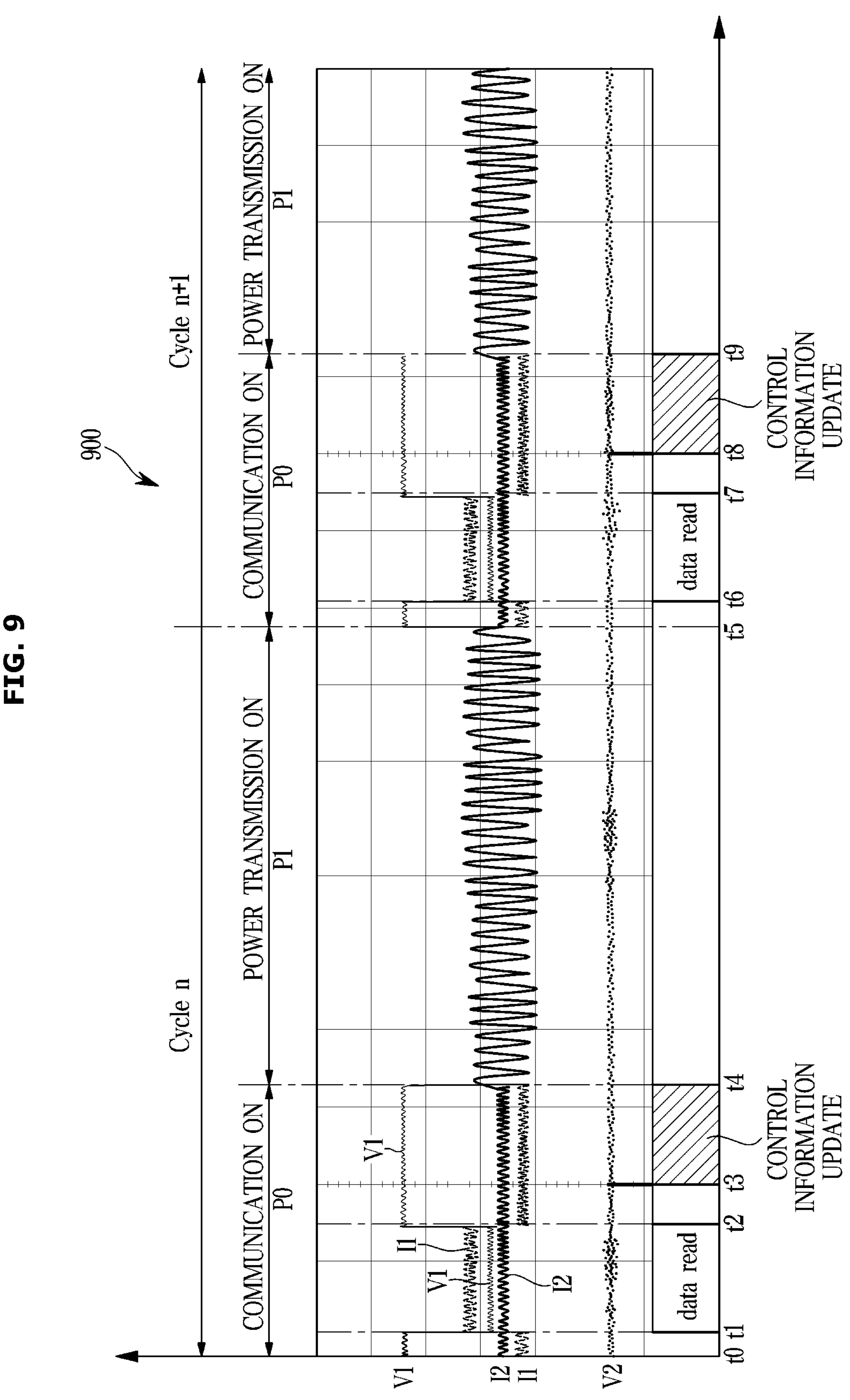
FIG. 9 is a graph illustrating example current waveforms and example voltage waveforms of a portion of constituent components during operation of an example a wireless power transmission apparatus according to various embodiments.

FIG. 9 is a graph 900 illustrating example current waveforms and example voltage waveforms of a portion of constituent components during operation of an example wireless power transmission apparatus according to various embodiments.

Referring to the graph 900 of FIG. 9, V1 represents a voltage waveform of a response signal transmitted from the second communication module 400 of the electronic device 2. I1 represents a waveform of a current applied to the first communication module 200 of the wireless power transmission apparatus 1. V2 represents a voltage waveform of a signal transmitted by the first communication module 200 of the wireless power transmission apparatus 1 to the first processor 322. I2 represents a waveform of a current applied to the power transmitting coil 21 of the wireless power transmission apparatus 1.

The first processor 322 of the wireless power transmission apparatus 1 may repeatedly perform wireless communication through the first communication module 200 and wireless power transmission through the power transmitting coil 21 based on a predetermined cycle. A cycle (Cycle n) may include a first time period P0 for performing wireless communication and a second time period P1 for transmitting wireless power. The second time period P1 for transmitting wireless power may, for example, be longer than the first time period P0 performing wireless communication.

Within the predetermined cycle (Cycle n), the first processor 322 may control the first communication module 200 to perform wireless communication with the electronic device 2 during the first time period P0 and control the driving circuit 310 to transmit wireless power through the power transmitting coil 21 during the second time period P1 longer than the first time period. For example, the cycle may be one second, the first time period P0 may be 0.1 seconds, and the second time period P1 may be 0.9 seconds. In each cycle, the wireless communication and the wireless power transmission may be alternately repeated.

The first processor 322 may apply the current I1 to the first communication module 200 of the wireless power transmission apparatus 1, so that the first communication module 200 may transmit a sensing signal for sensing the second communication module 400 of the electronic device 2. The second communication module 400 of the electronic device 2 may transmit a response signal V1 in response to the sensing signal. In response to receiving the response signal of the second communication module 400, the first communication module 200 may transmit a detection signal to the first processor 322. The first processor 322 may determine that wireless communication may be performed based on the detection signal.

In the graph 900 of FIG. 9, in a time period from t0 to t1, a time period from t2 to t4, a time period from t5 to t6, and a time period from t7 to t9, the transmission of the sensing signal is performed by the first communication module 200 and the transmission of the response signal is performed by the second communication module 400. In addition, at the points in time t0 and t5, the first processor 322 of the wireless power transmission apparatus 1 may transmit a power transmission stop signal to the first communication module 200. The first communication module 200 may perform wireless communication with the second communication module 400 of the electronic device 2 based on the power transmission stop signal.

The first communication module 200 may read data stored in the memory 422 of the second communication module 400, and may acquire control information stored in the memory 422 of the second communication module 400. In the time periods from t1 to t2 and from t6 to t7, the first communication module 200 may acquire the control information from the second communication module 400. The first communication module 200 acquires the control information after a predetermined period of time elapses from the points in time t0, t5 when the first communication module 200 receives the power transmission stop signal from the first processor 322, thereby reducing or removing noise caused by the power transmitting coil 21.

Meanwhile, a current applied to the first communication module 200 to acquire the control information from the second communication module 400 may be greater than a current applied to the first communication module 200 to transmit the sensing signal. Also, while the first communication module 200 is reading data from the second communication module 400, the response signal of the second communication module 400 may be weakened or not transmitted.

The first communication module 200 may transmit the acquired control information to the first processor 322. A signal transmitted from the first communication module 200 to the first processor 322 changes greatly at the points in time t3 and t8, and in this instance, the control information is transmitted to the first processor 322. The first processor 322 may update the received control information and adjust wireless power to be transmitted in a next cycle.

The first processor 322 of the wireless power transmission apparatus 1 may transmit a power transmission initiation signal to the first communication module 200 at the points in time t4 and t9. The first communication module 200 may stop the wireless communication based on the power transmission initiation signal transmitted from the first processor 322. The first processor 322 may also control the driving circuit 310 to transmit the wireless power from the points in time t4 and t9.

The wireless power transmission apparatus 1 may repeat the acquisition of the control information and the transmission of wireless power at each cycle, until the electronic device 2 terminates an operation.

As described above, the wireless power transmission apparatus, the control method thereof, and the wireless power system can smoothly perform near field communication and wireless power transmission and reception, even when a communication circuit for near field communication and a coil for transmitting and receiving wireless power are disposed adjacent to each other.

In addition, the wireless power transmission apparatus, the control method thereof, and the wireless power system can prevent or reduce damage to a communication circuit due to transmission and reception of wireless power.

Meanwhile, the disclosed embodiments may be embodied, for example, in the form of recording medium storing instructions executable by a computer. The instructions may be stored in the form of program code and, when executed by a processor, may generate a program module to perform the operations of the disclosed embodiments.

A machine-readable storage medium may be provided in the form of a non-transitory storage medium, wherein the term "non-transitory storage medium" refers to the medium being a tangible device and does not include a signal (e.g., an electromagnetic wave), but this term does not distinguish between data beings semi-permanently stored in the storage medium and data being temporarily stored in the storage medium. For example, a "non-transitory storage medium" may include, for example, a buffer in which data is temporarily stored.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)) or distributed (e.g., downloadable or uploadable) online through an application store (e.g., PLAYSTORE™) or directly between two user devices (e.g., smartphones). When distributed online, at least a portion of the computer program product (e.g., a downloadable application) may be temporarily generated or at least temporarily stored in the machine-readable storage medium, such as a memory of the manufacturer's server, an application store server, or a relay server.

Although embodiments of the disclosure have been described with reference to the accompanying drawings, a person having ordinary skilled in the art will appreciate that other specific modifications may be easily made without departing from the technical spirit or essential features of the disclosure. Therefore, the foregoing embodiments should be regarded as illustrative rather than limiting in all aspects.

What is claimed is:

1. A wireless power transmission system, comprising:

an electronic device; and a wireless power transmission apparatus, wherein the wireless power transmission apparatus comprises:

a plate;

a first communication circuit configured to perform wireless communication;

a power transmitting coil configured to transmit wireless power;

a driving circuit configured to apply a current to the power transmitting coil; and at least one processor, including processing circuitry, electrically connected to the first communication circuit, and the driving circuit, wherein the at least one processor is configured to:

control the first communication circuit to transmit a sensing signal; and based on receiving through the first communication circuit a response signal including start-up first control information transmitted by the electronic device positioned on the plate:

control the driving circuit based on the start-up first control information to transmit wireless power through the power transmitting coil for turning on the electronic device, in a first time period during which communication between the first communication circuit and a second communication circuit of the electronic device is stopped, control the first communication circuit to receive second control information from the second communication circuit of the turned on electronic device in a second time period during which transmitting of wireless power is stopped, and control the driving circuit to transmit wireless power to the electronic device based on the second control information in a third time period during which communication between the first communication circuit and the second communication circuit is stopped, wherein the first communication circuit is configured to stop wireless communication based on a power transmitting initiation signal received from the at least one processor, and resume wireless communication based on a power transmitting stop signal received from the at least one processor, wherein the first communication circuit is configured to receive the second control information, based on a predetermined period of time having elapsed from a point in time at which the power transmitting stop signal is received, wherein the electronic device is configured to store, in a memory of the second communication circuit, as the second control information, control information including at least one of an operation mode, an operation time, or a required power amount of the electronic device, the second control information being input through a user interface while the wireless power is being received, and wherein the stored second control information is acquired by the wireless power transmission apparatus during the second time period in which periodic transmission of the wireless power is stopped and is used to control subsequent transmission of wireless power.

2. The wireless power transmission system of claim 1, wherein the at least one processor is configured to:

receive a detection signal of the electronic device from the first communication circuit, and determine periodic transmission of wireless power based on the detection signal.

3. The wireless power transmission system of claim 1, wherein the at least one processor is configured to control the first communication circuit and the driving circuit to alternately repeat receiving of the second control information and transmitting of wireless power based on a predetermined cycle.

4. The wireless power transmission system of claim 3, wherein the at least one processor is configured to control the first communication circuit to perform wireless communication with the electronic device for a first time period within the predetermined cycle, and control the driving circuit to transmit wireless power through the power transmitting coil for a second time period within the predetermined cycle, the second time period being longer than the first time period.

5. The wireless power transmission system of claim 1, wherein the second control information includes required power information determined by operation settings of the electronic device, and the at least one processor is configured to adjust a magnitude of wireless power to be transmitted based on the required power information.

6. The wireless power transmission system of claim 1, wherein the first communication circuit and the second communication circuit each comprise:

an antenna;

an integrated circuit (IC) chip comprising a controller and a respective memory; and a capacitor connected in series between the antenna and the IC chip.

7. A control method of a wireless power transmission apparatus comprising a first communication circuit, configured to perform wireless communication, a power transmitting coil configured to transmit wireless power, a driving circuit configured to apply a current to the power transmitting coil, and at least one processor electrically connected to the first communication circuit and the driving circuit, the control method comprising:

transmitting, by the first communication circuit, a sensing signal; and based on receiving, by the first communication circuit, a response signal including start-up first control information transmitted by an electronic device positioned on the wireless power transmission apparatus:

controlling the driving circuit based on the start-up first control information to transmit wireless power through the power transmitting coil for turning on the electronic device, in a first time period during which communication between the first communication circuit and a second communication circuit of the electronic device is stopped;

controlling the first communication circuit to receive second control information from the second communication circuit of the turned on electronic device in a second time period during which the transmitting of wireless power is stopped; and controlling the driving circuit to transmit wireless power to the electronic device based on the second control information in a third time period during which communication between the first communication circuit and the second communication circuit is stopped, wherein the method further comprises:

stopping wireless communication based on a power transmission initiation signal transmitted from the at least one processor to the first communication circuit; and resuming wireless communication based on a power transmission stop signal transmitted from the at least one processor to the first communication circuit, and wherein the controlling of the first communication circuit comprises receiving the second control information based on a predetermined period of time having elapsed from a point in time at which the power transmission stop signal is received, wherein the electronic device is configured to store, in a memory of the second communication circuit, as the second control information, control information including at least one of an operation mode, an operation time, or a required power amount of the electronic device, the second control information being input through a user interface while the wireless power is being received, and wherein the stored second control information is acquired by the wireless power transmission apparatus during a first time period in which periodic transmission of the wireless power is stopped and is used to control subsequent transmission of wireless power.

8. The control method of claim 7, wherein the receiving of second control information and the transmitting of wireless power are alternately repeated based on a predetermined cycle.

9. The control method of claim 8, wherein the predetermined cycle includes a first time period for performing wireless communication and a second time period for transmitting wireless power, wherein the second time period is longer than the first time period.

10. The control method of claim 7, wherein the second control information includes required power information determined by operation settings of the electronic device, and the control method comprises adjusting a magnitude of the wireless power to be transmitted based on the required power information.

* * * * *